United States Patent
Mildner et al.

(10) Patent No.: US 9,745,001 B2
(45) Date of Patent: Aug. 29, 2017

(54) MOTOR VEHICLE AND FLOOR MODULE

(71) Applicant: GM GLOBAL TECHNOLOGY OPERATIONS LLC, Detroit, MI (US)

(72) Inventors: Udo Mildner, Ruesselsheim (DE); Lothar Teske, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/204,411

(22) Filed: Jul. 7, 2016

(65) Prior Publication Data
US 2017/0008574 A1    Jan. 12, 2017

(30) Foreign Application Priority Data
Jul. 7, 2015 (DE) .......................... 10 2015 008 727

(51) Int. Cl.
| | |
|---|---|
| *B62D 29/04* | (2006.01) |
| *B62D 25/20* | (2006.01) |
| *B60K 1/04* | (2006.01) |
| *B62D 25/08* | (2006.01) |

(52) U.S. Cl.
CPC .............. *B62D 29/043* (2013.01); *B60K 1/04* (2013.01); *B62D 25/087* (2013.01); *B62D 25/20* (2013.01); *B60K 2001/0416* (2013.01); *B60K 2001/0438* (2013.01); *B60Y 2304/03* (2013.01); *B60Y 2306/01* (2013.01)

(58) Field of Classification Search
CPC .... B60K 2001/0438; B60K 2001/0416; B60Y 2306/01
See application file for complete search history.

(56) References Cited

U.S. PATENT DOCUMENTS

| | | | |
|---|---|---|---|
| 4,174,014 A | 11/1979 | Bjorksten | |
| 9,056,633 B2 | 6/2015 | Lohmann et al. | |
| 9,061,712 B2 | 6/2015 | Patberg et al. | |
| 9,254,874 B2 | 2/2016 | De Luca et al. | |
| 9,346,425 B2 * | 5/2016 | Steinmetz | F16F 7/121 |
| 2012/0261206 A1 * | 10/2012 | Yasui | B60L 11/1877 180/274 |
| 2014/0042775 A1 | 2/2014 | Steinmetz et al. | |
| 2016/0194030 A1 | 7/2016 | Patberg et al. | |
| 2016/0272245 A1 * | 9/2016 | Berger | B60K 1/00 |
| 2016/0375750 A1 * | 12/2016 | Hokazono | B60K 1/04 180/68.5 |

FOREIGN PATENT DOCUMENTS

| | | |
|---|---|---|
| DE | 102012217180 A1 | 4/2013 |
| JP | 2000053019 A | 2/2000 |
| WO | 2008099128 A2 | 8/2008 |

OTHER PUBLICATIONS

German Patent Office, German Search Report for German Application No. 102015008727.4, dated Apr. 15, 2016.
Great Britain Patent Office, Great Britain Search Report for Great Britain Application No. 1610396.2, dated Nov. 15, 2016.

* cited by examiner

*Primary Examiner* — Brian Swenson
(74) *Attorney, Agent, or Firm* — Lorenz & Kopf LLP

(57) ABSTRACT

A floor module is provided for installation in the rear area of a motor vehicle. A rear area of the floor module facing the tail of the vehicle includes a first plastic composition, and a front area facing away from the tail includes a second plastic composition, wherein the first plastic composition imparts a higher elastic deformability to the rear area than to the front area.

17 Claims, 4 Drawing Sheets

MOTOR VEHICLE AND FLOOR MODULE

CROSS-REFERENCE TO RELATED APPLICATION

This application claims priority to German Patent Application No. 102015008727.4, filed Jul. 7, 2015, which is incorporated herein by reference in its entirety.

TECHNICAL FIELD

The present disclosure pertains to a floor module for use in a motor vehicle, and the motor vehicle incorporating same.

BACKGROUND

Population growth in congested urban centers is leading to a continuously growing vehicle density, and to a correspondingly rising demand for parking and transport areas that can only be satisfied on a limited available space at ever greater costs. In order to keep land usage and fuel consumption by private transport within reasonable limits, extremely compact vehicles with a low weight and correspondingly low fuel consumption must be more-readily available.

One way of minimizing weight involves no longer manufacturing parts of a motor vehicle body that have no supporting or passenger compartment-reinforcing function out of metal, but rather out of plastic. For example, DE 10 2010 054 693 A1 discloses a floor module for a motor vehicle that encompasses a base trough injection molded out of plastic as a single piece.

The trough must be stiff enough to support a vehicle battery and spare tire. If it is made stiffer, however, the greater the danger that it will break when deformed in an accident, and then has to be replaced. In the known floor module, the danger of such breakage is limited by the fact that it does not reach directly up to a rear cross member of the vehicle body, so that the latter can be deformed during an accident without also affecting the floor module. In an extremely compact urban vehicle, it is virtually impossible to secure a floor module far enough away from the outer skin of the body as to keep it from deforming and breaking during a minor accident. However, if the floor module is broken, it must be removed and replaced with a new one. The high repair costs associated therewith can result in an unfavorable classification of the vehicle at insurance companies, and thus lead to correspondingly operating costs for the vehicle owner.

Therefore, there exists a demand for a motor vehicle or components for the latter that minimize the repair expenses after an accident, even given a compact and weight-saving construction.

SUMMARY

In one embodiment of the present disclosure, this demand is satisfied by a floor module to be installed in the rear area of a motor vehicle, in which a rear area of the floor module facing the tail of the vehicle includes a first plastic composition, and a front area facing away from the tail includes a second plastic composition. The first plastic composition imparts a higher elastic deformability to the rear area than to the front area. As a consequence, because the front area that is at best minimally endangered during a minor accident can be relatively stiff so as to impart the mechanical resilience to the floor module required for transporting goods thereon, the rear area can be deformed to a great extent in light of its elasticity, without this posing a danger of breakage or in some other way impairing the mechanical integrity of the floor module.

The front and rear areas of the floor module are preferably designed as a single piece with each other, for example by coextruding the first and second plastic composition in a shared mold, or by deep-drawing flat material cuts consisting of the first and second plastic composition together in an identical forming tool, and welding them together in the process.

The entire floor module is typically shaped like a trough. One part of a flat floor plate of the floor module can consist of the relatively slightly deformable front area, and the other part of the highly deformable rear area. A horizontal mounting flange for attaching the floor module to other parts of the body of the motor vehicle can extend around the floor plate. In order to create the aforementioned trough shape, one wall can extend around the floor plate. It makes sense for the mounting flange to be stiffened by ribs, which extend between a lower side of the mounting flange and an exterior side of this wall that joins together the floor plate and flange.

A receptacle for a motor vehicle battery is preferably formed in the relatively slightly deformable front area of the floor module. In order to secure the battery in the receptacle, the receptacle can be bordered from behind by a rib that protrudes upward from the front area of the floor module. In addition, the receptacle can be bordered laterally by a projection that protrudes from the front area of the floor module and onto which can be secured, in particular plugged, a hook for encompassing a rear side of the battery. The projection can encompass a threaded bolt, to which the hook can be attached by screwing on a nut. In order to simplify vehicle assembly, the floor module and vehicle battery pre-installed in the receptacle of the floor plate can together form an assembly, which can be built into the vehicle body according to the present disclosure as one unit.

In another embodiment of the present disclosure, the demand is satisfied by an assembly with a floor module as described above, and by a vehicle battery pre-installed in the receptacle of the floor module.

In another embodiment of the present disclosure, the demand is satisfied by a motor vehicle with a floor module or an assembly as described above, in which a front edge of the floor module is anchored to a central, rear cross member of the motor vehicle. Storage space can be created between the cross member and floor module by having the front area of the floor module extend under the front cross member, and used in particular to accommodate the vehicle battery. A rear edge of the floor module can be anchored to a rear cross member of the motor vehicle. Even if its exposed position puts this rear cross member at great risk of being deformed during a collision between the rear of the motor vehicle and an obstacle, damage to the floor module can be averted by this deformation due to the elasticity of the rear area.

The floor module is preferably detachably anchored by fasteners such as screws or bolts, on the one hand so that the latter can be easily detached from the floor module and repaired or replaced given a deformation of the rearmost cross member, without having to also remove the floor module for this purpose, and on the other hand so that the floor module can also be quickly and inexpensively replaced if a collision was strong enough to damage the floor module, e.g., by deforming it all the way into its front area.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
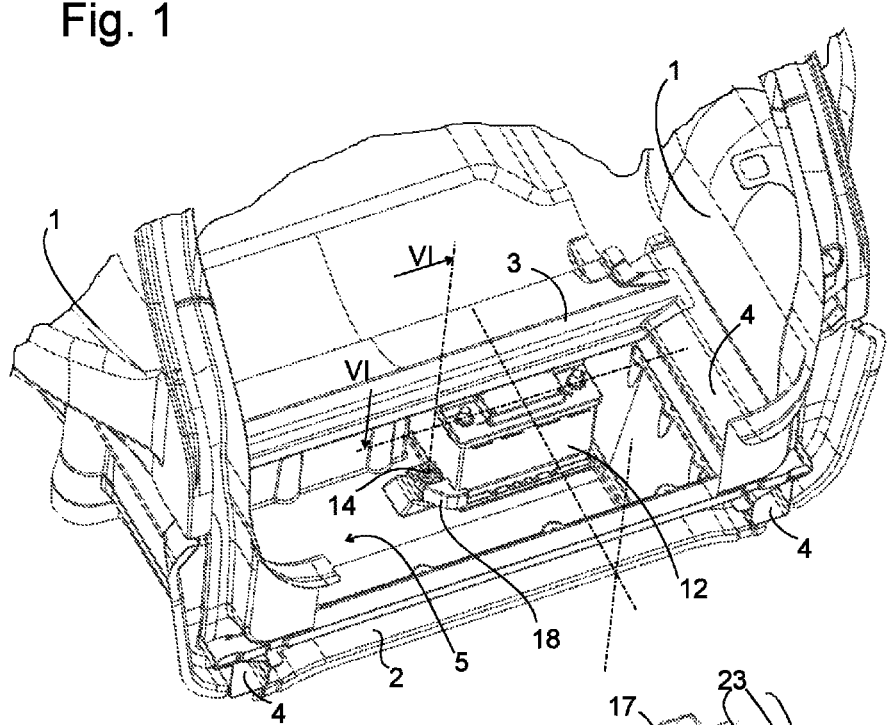
FIG. 1 is a view of the rear section of a motor vehicle according to the present disclosure.

FIG. 1 shows a perspective view of the rear area of the body of a compact motor vehicle according to the present disclosure. The body has a ladder-like support structure with two side members 4 extending along the flanks of the vehicle and several cross members joining the side members together. A tailgate of the body has been omitted on the figure, so that, of these cross members, a rear cross member 2 and a central rear cross member 3 are visible through the tailgate opening between two side walls 1 of the body. The two cross members 2, 3 and the side members 4 together include a rectangular frame, under which a trough-shaped floor module 5 is attached.

Figure 2:
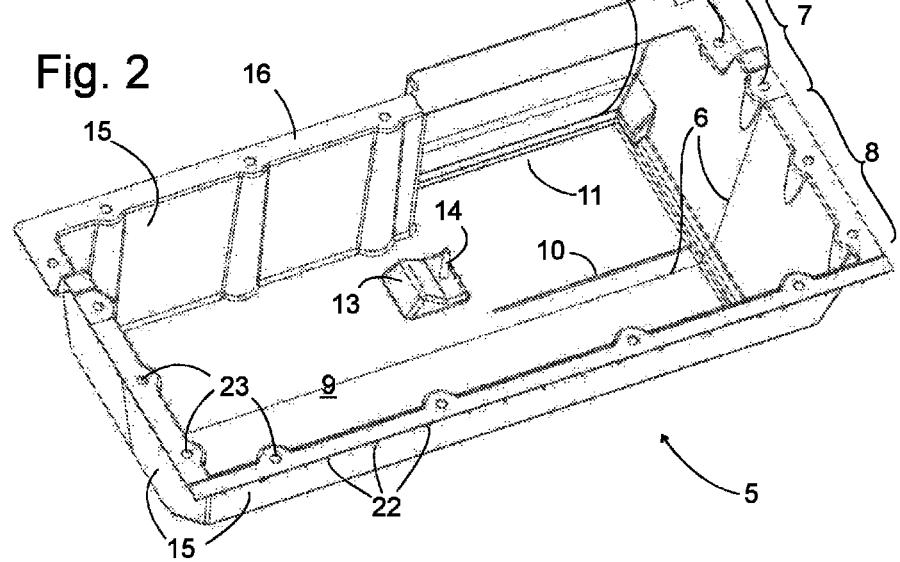
FIG. 2 is the floor module of the vehicle, viewed from the same direction as on FIG. 1.
Figure 3:
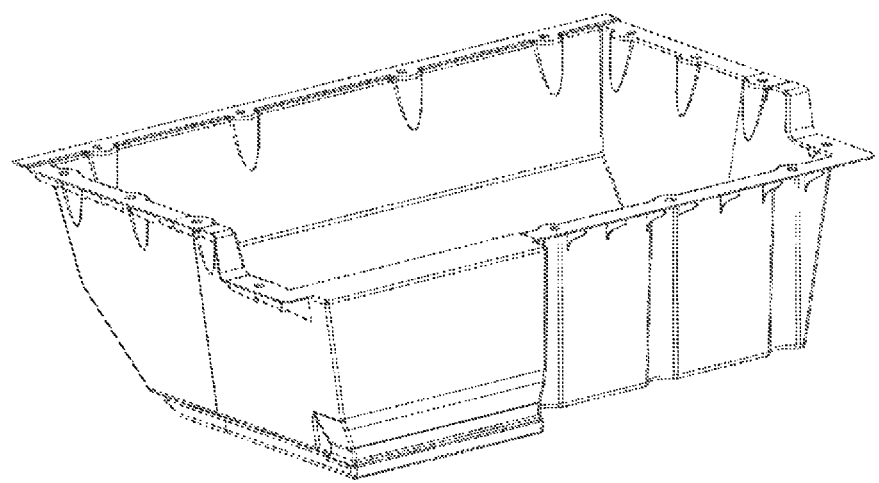
FIG. 3 is a view of the floor module, inclined from the front.

FIG. 2 shows the floor module 5 separate from the body. The floor module 5 is injection molded as a single piece out of two different plastic compositions, wherein a line 6 extending in the vehicle transverse direction establishes the boundary between a front area 7—relative to the traveling direction of the vehicle—included of a relatively stiff, dimensionally stable plastic and a rear area 8 included of a plastic that to a large extent is elastically deformable. An essentially flat base plate 9 belongs in part to the front area 7, and in part to the rear area 8. A rib 10 elongated in the vehicle transverse direction extends parallel to the line 6 in the front, stiff area of the base plate 9 over part of its width. Located opposite the rib 10 is a bulge 11 on a front edge of the base plate; the storage space between the bulge 11 and rib 10 is provided to accommodate a battery 12 of the vehicle, as depicted on FIGS. 1 and 4.

A projection at a central location of the stiff area of the base plate 9 is formed by crafting an elevation 13 from the stiff plastic, and anchoring an upwardly protruding threaded bolt 14 therein. As visible in particular on FIG. 6, the threaded bolt 14 can consist of a screw, the head of which was embedded into the stiff plastic of the front area 7 while injection molding the floor module 5.

A continuous wall 15 extends all the way around the rectangular base plate 9, and also includes the stiff plastic in the front area 7, and the elastically deformable plastic in the rear area 8. A seamless, continuous flange 16 extends along the upper edge of the wall 15. An inwardly protruding, horizontally elongated projection 17 is formed on the wall 15 in proximity to the base plate 9 in the area of the bulge 11, so that the battery 12 can latch positively in place in front of the rib 10 and under the projection 17.

Figure 4:
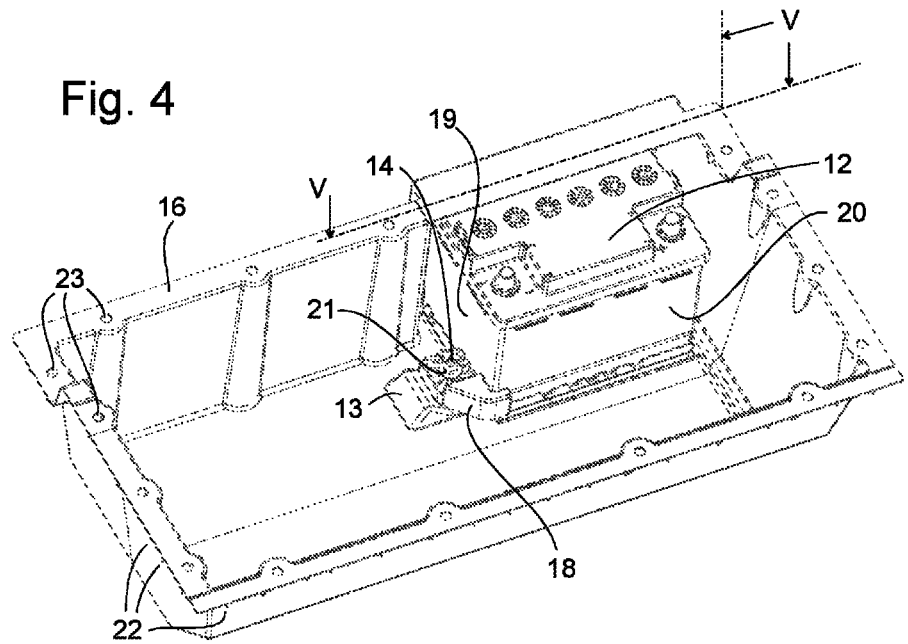
FIG. 4 is an assembly included of the floor module and a vehicle battery mounted thereto.

In order to secure the battery 12 in this latched position, a hook 18 injection molded out of plastic is plugged onto the threaded bolt 14, and, as depicted on FIG. 4, abuts against a narrow side 19 of the battery and its broadside 20 facing the vehicle rear, and is fixed in its position by a nut 21 screwed onto the threaded bolt 14.

Figure 5:
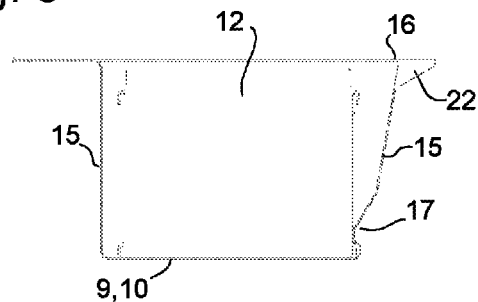
FIG. 5 is a section through the floor module in the vehicle transverse direction, along the plane marked V-V on FIG. 4.

FIG. 5 presents a schematic section through the floor module 5 and battery 12 along the plane marked V-V on FIG. 4 and running through the bulge 11. The flange 16 extends above the bulge 10 from the upper edge of the wall 15 over the base plate 9, so that the storage space formed between the flange 16 and base plate 9 is shaped like a niche 24, into which the battery 12 is pushed from behind in the sequence of motions shown on FIG. 7, and secured among other things via positive engagement under the projection 17.

The flange 16 extends outwardly from a side section of the wall 15 profiled on FIG. 5, and is stiffened by triangular ribs 22 that extend between the lower side of the flange 16 and the wall 15. Such ribs 22 are distributed along the flange 16 on all four sides of the floor module 5, in particular so as to stiffen those areas of the flange 16 recessed to form a screw hole 23. The screw holes 23 are used to attach the floor module 5 to the lower sides of the side and cross members 2, 3, 4 by means of screws, which pass through the screw holes 23 from below and engage threads on the side and cross members 2, 3, 4.

Figure 6:
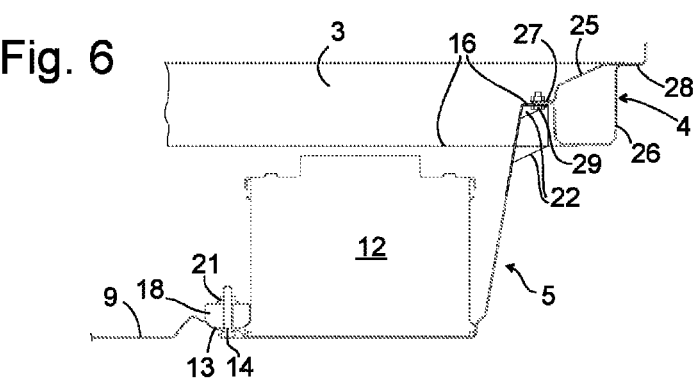
FIG. 6 is a section in the vehicle transverse direction along the VI-VI plane on FIG. 1.

FIG. 6 presents a section through the floor module 5, the battery 12 and a side member 4 along the plane marked VI-VI on FIG. 1 and runs through the axis of the threaded bolt 14. The side member 4 includes two metal sheets 25, 26, which are welded together on flanges 27, 28 extending in the vehicle longitudinal direction. The flange 16 of the floor module 5 touches the lower side of the flange 27 facing the vehicle interior, and is detachably secured to the latter by screws 29 extending through the screw holes 23 from below.

Figure 7:
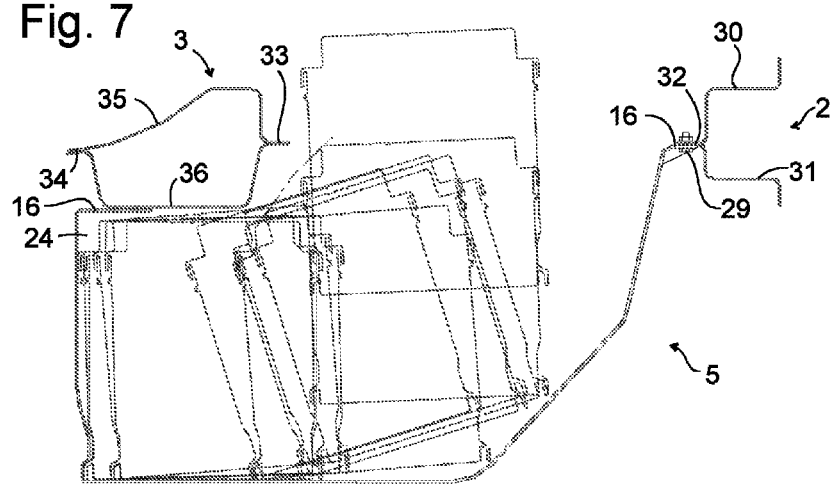
FIG. 7 is a section in the vehicle longitudinal direction along the plane on FIG. 1.

As evident from FIG. 7, the rear cross member 2 also encompasses two metal sheets 30, 31, which are welded together on a flange 32. This flange 32 lies at the same height as the flange 27 of the side member 4, and the flange 16 of the floor module 5 is also secured thereto by screws 29.

Below the central, rear cross member 3, the flange 16 of the floor module 5 runs at a deeper level than along the side member 4 and the rear cross member 2. While the central, rear cross member 3 also encompasses two metal sheets 35, 36 welded together along flanges 33, 34, the flange 16 here is not bolted to the flanges 33, 34, but rather at a lower level to the lower side of the metal sheet 36.

Figure 8:
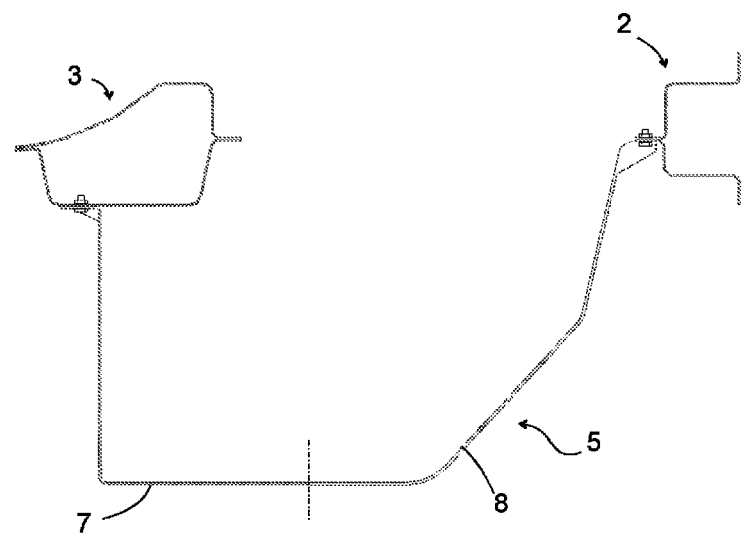
FIG. 8 is a section in the vehicle longitudinal direction along the vehicle center plane in an intact state.
Figure 9:
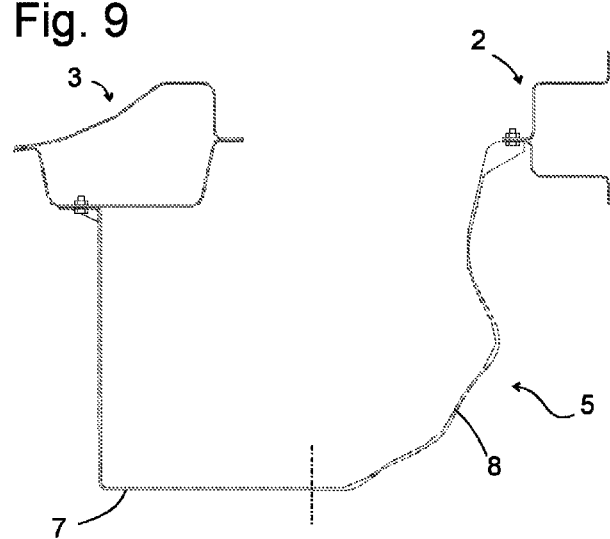
FIG. 9 is a section similar to FIG. 8 in the deformed state after a collision.

FIG. 8 shows the floor module 5 bolted to the rear cross member 2 and central, rear cross member 3 in an intact, non-deformed state. On FIG. 9, a portion of the rear cross member 2 is forwardly displaced toward the central, rear cross member 3 by a collision. The resultant deformation of the floor module 5 is concentrated on the slightly deformable, elastic rear area 8; the stiff front area 7 is essentially not deformed. If the deflected rear cross member 2 is again aligned or replaced during repairs, the elasticity of the rear area 8 allows it to return to the configuration on FIG. 8, without requiring any further action for this purpose.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A floor module configured to be installed in the rear section of a motor vehicle, the floor module comprising:
   a base plate configured to be supported substantially horizontally in the rear section of the motor vehicle;
   a rear wall that extends from the base plate, the rear wall configured to be disposed proximate a rear end of the vehicle, the rear wall having a first plastic composition; and
   a front wall that extends from the base plate, the front wall spaced apart at a distance from the rear wall across the base plate, the front wall having a second plastic compositions;
   wherein a first portion of the base plate and the rear wall cooperate to define a rear section of the floor module;
   wherein a second portion of the base plate and the front wall cooperate to define a front section of the floor module; and
   wherein the first plastic composition imparts a higher elastic deformability to the rear section than the second plastic composition imparts to the front section.

2. The floor module according to claim 1, wherein the front section and the rear section are configured a single piece.

3. The floor module according to claim 1, wherein the floor module comprises a trough.

4. The floor module according to claim 1, wherein the base plate is substantially.

5. The floor module according to claim 4, further comprising a horizontal mounting flange extending around the base plate.

6. The floor module according to claim 5, further comprising at least one rib extending between a lower side of the mounting flange and an exterior side of one of the rear wall and the front wall, wherein the mounting flange is stiffened by the at least one rib.

7. The floor module according to claim 1, wherein the front section comprises a receptacle configured to receive a vehicle battery.

8. The floor module according to claim 7, further comprising a rib bordering the receptacle, wherein the rib protrudes upward from the front section of the floor module.

9. The floor module according to claim 7, further comprising a projection bordering the receptacle from the side, wherein the projection protrudes upward from the front section of the floor module and receives a hook configured to encompass at least one side of the battery.

10. An assembly with a floor module according to claim 7 and further comprising a vehicle battery installed in the receptacle.

11. A motor vehicle with a floor module according to claim 1, wherein the floor module comprises a front edge anchored to a central cross member of a vehicle body.

12. The motor vehicle according to claim 11, wherein the front section of the floor module extends under the central cross member and a storage space is bordered from above by the central cross member and from below by the front section.

13. The motor vehicle according to claim 11, wherein the floor module further comprises a rear edge anchored on a rear cross member of the vehicle body.

14. The motor vehicle according to claim 11, further comprising a plurality of fasteners detachably anchoring the floor module to the vehicle body.

15. The floor module according to claim 1, wherein the rear wall and the first portion of the base plate have the first plastic composition; and
   wherein the front wall and the second portion of the base plate have the second plastic composition.

16. The floor module of claim 15, further comprising a first side wall and a second side wall;
   wherein the first side wall and the second side wall extend between the rear wall and the front wall on opposite sides of the base plate;
   wherein a first rear section of the first side wall and a second rear section of the second side wall have the first plastic composition;
   wherein the first rear section of the first side wall, the second rear section of the second side wall, the first portion of the base plate, and the rear wall cooperate to define the rear section of the floor module;
   wherein a first front section of the first side wall and a second front section of the second side wall have the second plastic composition; and
   wherein the first front section of the first side wall, the second front section of the second side wall, the second portion of the base plate, and the front wall cooperate to define the front section of the floor module.

17. The floor module of claim 16, wherein a boundary is defined where the rear section attaches to the front section; and
   wherein the boundary lies substantially within a plane and extends through the first side wall, the base plate, and the second side wall.

* * * * *